(12) United States Patent
Johnston et al.

(10) Patent No.: US 8,055,616 B2
(45) Date of Patent: Nov. 8, 2011

(54) APPLICATION SHARING SMOOTHNESS

(75) Inventors: James S. Johnston, Lexington, KY (US); William M. Quinn, Lexington, KY (US); Kevin Solie, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 2189 days.

(21) Appl. No.: 10/877,903

(22) Filed: Jun. 25, 2004

(65) Prior Publication Data

US 2005/0289176 A1    Dec. 29, 2005

(51) Int. Cl.
*G06G 7/00* (2006.01)
*G06F 17/30* (2006.01)
(52) U.S. Cl. ......................................................... 707/611
(58) Field of Classification Search ............... 707/104.1, 707/201, 611; 345/762
See application file for complete search history.

(56) References Cited

U.S. PATENT DOCUMENTS 6,771,291 B1 *  8/2004  DiStefano, III ............... 715/762

OTHER PUBLICATIONS

Frederick et al., "Collaborative Distributed Virtual Sculpting" Proc. of the Virtual reality 2001 Conference, pp. 217-224, 2001, IEEE.*
Bier at al., "MMM: A User Interface Architechture for Shared Editors on a Single Screen", Symposium on User Interface Software and Technology, Proceedings of the 4th annual ACM symposium on User interface software and technology, pp. 79-86; ACM, 1991.*

* cited by examiner

*Primary Examiner* — Michael Hicks
(74) *Attorney, Agent, or Firm* — Steven M. Greenberg, Esq.; Carey, Rodriguez, Greenberg & Paul

(57) ABSTRACT

A method, system and apparatus for application sharing smoothness when updating application screen imagery in an application sharing system. A shared application smoothness system can include an application sharing server configured for communicative coupling to multiple application sharing clients. The system further can include an application image update smoothness processor programmed to consolidate changes to adjacent image regions in an image of a shared application for transmission to the communicatively coupled application sharing clients in a single application image update interval. A shared application smoothness method can include the steps of detecting common shared image changes across multiple adjacent display regions of a shared application image and transmitting updates for the multiple adjacent display regions to communicatively coupled application sharing clients in a single image update interval.

11 Claims, 3 Drawing Sheets

APPLICATION SHARING SMOOTHNESS

BACKGROUND OF THE INVENTION

1. Statement of the Technical Field

The present invention relates to application sharing, and more particularly to updating displays across application sharing clients in a shared application system.

2. Description of the Related Art

The rapid development of the computer communications networks has led to advanced modes of communication and collaboration. Using computer communications networks such as the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include instant messaging, Internet telephony and application sharing.

In conventional application sharing, an application host can distribute imagery of an application operating in the host to one or more application viewers distributed about the computer communications network. The imagery can include not only the screens rendered in association with the operation of the shared application, but also the visual presentation of mouse pointer movements and the like. Generally, speaking, however, the imagery can include only discrete "snap-shots" of the actual display of the operating application in the host system. In this way, the application viewers can be given the appearance of sharing an application, though each viewer merely views a shadow rendering of only a portion of the operation of the shared application.

Application sharing technology allows the capturing of a series of images which represent the display of an application or even the display of an operating system desktop of a computing device. The images can be transmitted across the computer communications network, which when rendered, can provide the illusion of duplicating the display of the application in its host environment. Nevertheless, the underlying technology used to support application sharing in this manner includes substantial limitations in regard to the refreshing of application imagery during an application sharing session.

Specifically, to achieve certain processing resource conservation efficiencies, in conventional application sharing programs, an application screen image can be partitioned into different regions. Each region can be individually captured, scanned for changes, compressed and transmitted to application sharing clients. By partitioning an application screen into small, manageable portions, the responsiveness of the host application can be improved by performing processor intensive operations upon smaller chunks of data. Moreover, only those portions of the application screen image which have changed need be forwarded to application sharing clients, while the unchanged portions need not be transmitted at all.

In consequence of this clever technique for improving the performance of an application sharing program, it is presupposed that all changed aspects of a portion of an application screen image can be definitively bound by a discrete region of the screen image. In fact, however, in many circumstances a changed aspect of a portion of an application screen image can span multiple discrete regions of the screen image. Consequently, when a change in an application screen image is detected which spans multiple discrete regions of the application screen image, multiple changed portions of the screen image will be transmitted sequentially causing multiple, undesirable screen updates to occur in the application sharing clients. The resulting effect often has been referred to as the "blockiness" effect.

SUMMARY OF THE INVENTION

The present invention addresses the deficiencies of the art in respect to the updating of application sharing screen image updating and provides a novel and non-obvious method, system and apparatus for application sharing smoothness when updating application screen imagery in an application sharing system. A shared application smoothness system can include an application sharing server configured for communicative coupling to multiple application sharing clients. The system further can include an application image update smoothness processor programmed to consolidate changes to adjacent image regions in an image of a shared application for transmission to the communicatively coupled application sharing clients in a single application image update interval.

A shared application smoothness method can include the steps of detecting common shared image changes across multiple adjacent display regions of a shared application image and transmitting updates for the multiple adjacent display regions to communicatively coupled application sharing clients in a single image update interval. In this regard, by common shared image changes it is meant that adjacent regions contain changes that are to be considered as part of a single screen change in the displays of the application sharing clients. In any case, the detecting step can include identifying a change in a primary display region in the shared application image, testing display regions which are adjacent to the primary display region for changes, and grouping individual ones of the tested display regions with the primary display which are determined to have changed. The transmitting step, by comparison, can include transmitting updates for the grouping to the communicatively coupled application sharing clients in a single image update interval.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for application sharing smoothness. In accordance with the present invention, a shared application screen image can be partitioned into image regions which can be monitored for changes within each region. When a change is detected in any one of the regions, it can be determined whether the change is localized to the region, or whether the change spans multiple adjacent regions. In the event that the change spans multiple adjacent regions, the extent of the change can be computed and the affected regions can be transmitted as a consolidated update to clients of the shared application. In this way, the individually effected regions need not be transmitted individually and sequentially as separate updates, thereby consuming unnecessary computational and communicative resources.

Figure 1:
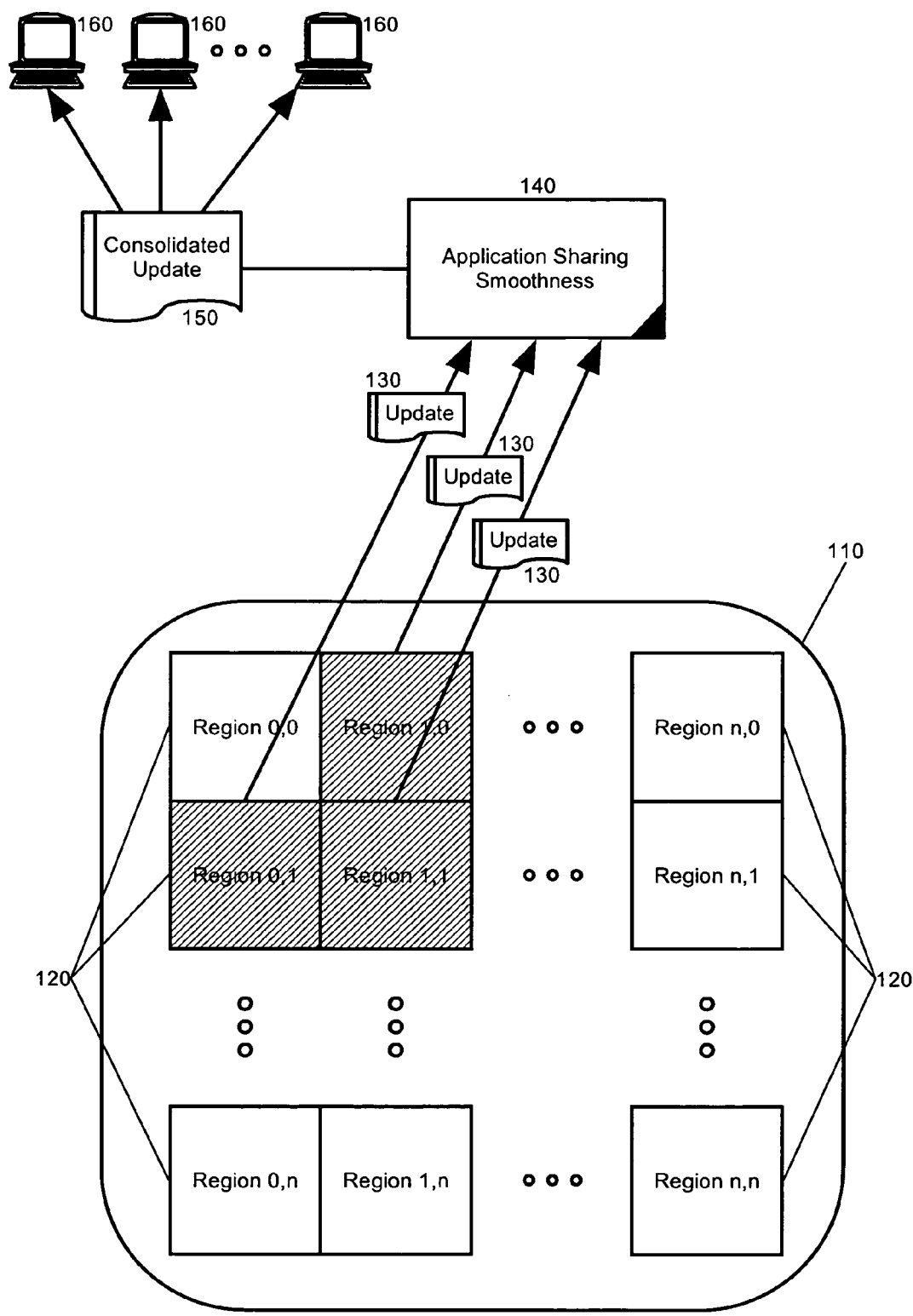
FIG. 1 is a pictorial illustration of a system, method and apparatus for application sharing smoothness in accordance with the present invention.

In more particular illustration of the foregoing inventive arrangement, FIG. 1 is a pictorial illustration of a system, method and apparatus for application sharing smoothness. In accordance with the present invention, a shared application screen 110 can be shared with one or more application sharing clients 160 so that changes in the shared application screen 110 can appear in the application sharing clients 160. For efficiency of processing, the shared application screen 110 can be partitioned into multiple display regions 120. In this regard, only changed ones of the multiple display regions 120 can be forwarded to the application sharing clients 160 while unchanged ones of the multiple display regions 120 need not be forwarded to the application sharing clients 160.

Importantly, when a change is detected in a selected one of the multiple display regions 120, adjacent ones of the multiple display regions 120 can be tested to determine whether the adjacent ones of the multiple display regions 120 also have changed. To the extent that the changes to one of the multiple display regions 120 are determined to extend to adjacent ones of the multiple display regions 120, individual updates 130 to the effected ones of the multiple display regions 120 can be forwarded to an application smoothness process 140. The application smoothing process 140 in turn can produce a consolidated update 150 for use in updating the application sharing clients 160 in a single updating transaction rather than in separate, consecutive updating transactions. Alternatively, the individual updates 130 can be forwarded to the application sharing clients 160 where the start and end of the updates 130 are denoted and the application sharing clients 160 can be tasked to repaint the application to simulate a single, consolidated update 150.

Figure 2:
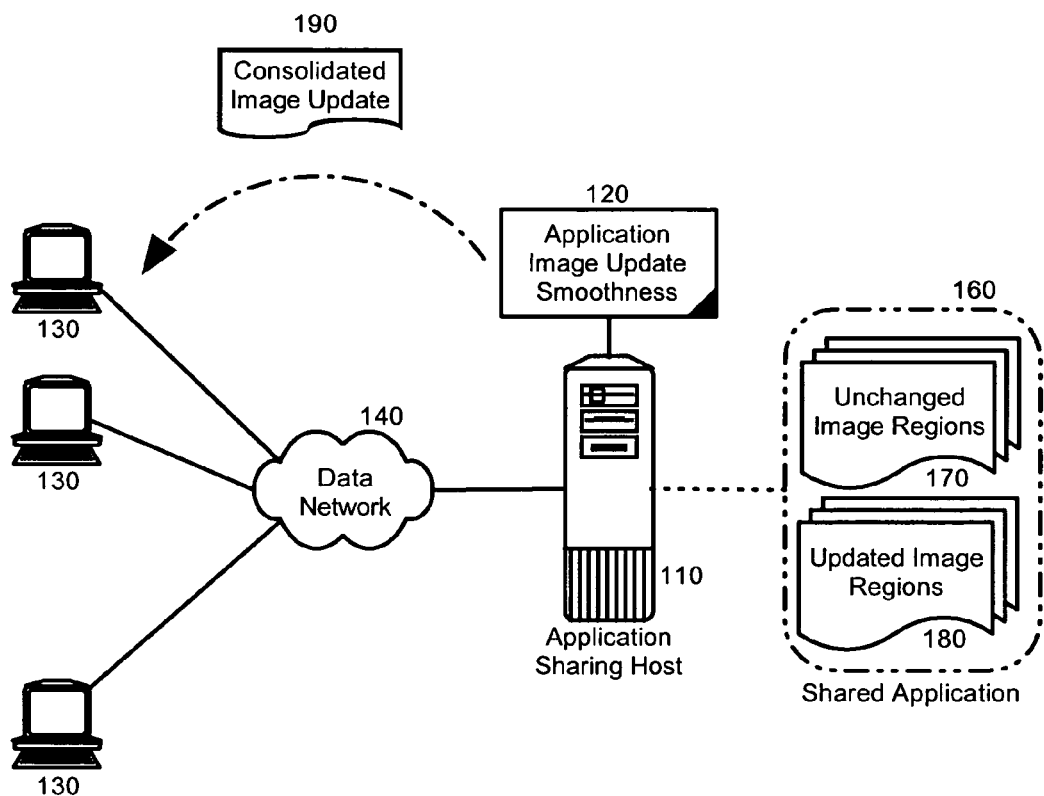
FIG. 2 is a schematic illustration of an application sharing system configured for application sharing smoothness; and, FIG. 3 is a flow chart illustrating an application sharing smoothness process for application the system of FIG. 2.

Turning now to FIG. 2, a schematic illustration of an application sharing system is shown in which the system has been configured for application sharing smoothness. The system can include an application sharing host 110 coupled to one or more application sharing clients 130 over a data communications network 140. The application sharing host 110 can host a shared application 160 so that the application sharing clients 130 can each view a virtual representation of an actual execution of an application. In this regard, when changes to the display of the shared application 160 occur, the host of the shared application 160 can transmit screen images of the shared application 160 to the application sharing clients 130 at intervals suitable for providing an appearance that the application sharing clients 130 view the real-time operation of the shared application 160.

To enhance the efficiency of operation of the application sharing server 110, only updated image regions 180 of the shared application 160 need be forwarded to the application sharing clients 130 during an update interval. To that end, the unchanged image regions 170 of the shared application 160 need not be forwarded to the application sharing clients 130 during an update interval. Significantly, an application image update smoothness process 120 residing within or communicatively coupled to the application sharing server 110 can determine whether any of the updated image regions 180 share common changed content—that is, content which has changed in the image regions 180 which is to be considered part of a single screen change of content to be updated in a single screen refresh. If so, the updated image regions 180 which share common changed content can be aggregated as a consolidated update 190 during a single update interval. As a result, the updated image regions 180 affected by the common changed content need not be forwarded to the application sharing clients 130 piecemeal during different update intervals resulting in undesirable blockiness.

Figure 3:
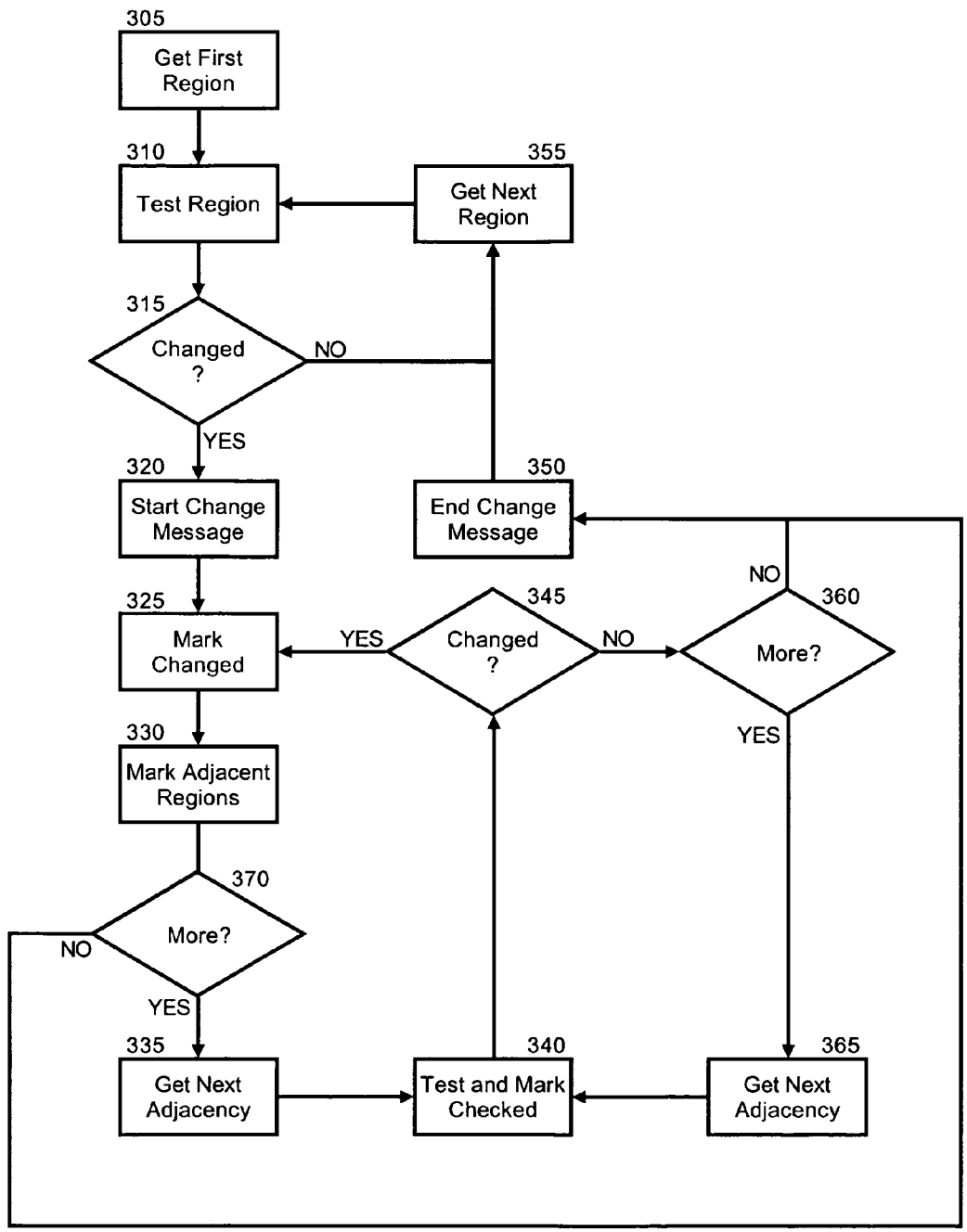

In more particular illustration of the application smoothing process, FIG. 3 is a flow chart illustrating an application sharing smoothness process for use in the system of FIG. 2. Beginning in block 305, at the outset of an update interval a first region of the application screen image can be selected for analysis. In block 310, the region can be tested to determine if the image content within the region has changed. If in decision block 315 it is determined that the image content within the region has not changed, in block 355 the next region of the application screen image can be selected for analysis. Otherwise, the process can continue through block 320.

In block 320, a start change message can be constructed indicating the beginning of a consolidated image update. In this way, a corresponding end change message can be subsequently constructed to indicate the end of a consolidated image update. In any event, in block 325 the image region under analysis can be marked as having changed and in block 330 those regions which are adjacent to the image region under analysis can be marked as adjacent and requiring analysis. As such, if in decision block 370 it is determined that adjacent regions have not yet been tested, in block 335 the first adjacent region can be retrieved for analysis. Subsequently, in block 340 the retrieved region can be tested to determine if the image content within the region has also changed and the retrieved region can be marked as having been analyzed.

In decision block 345, if it is determined that the image content within the retrieved region has changed, in block 325 the retrieved region can be marked as having changed and, as before, those regions adjacent to the retrieved region can be marked as requiring analysis in block 330. Notably, the process can continue until no adjacent regions to a retrieved region are determined to include image content which has changed since the last update interval. At this point, leading from decision block 345 and into decision block 360 it can be determined if additional adjacent regions remain which have not yet been analyzed. If so, the next adjacency can be retrieved for analysis and the process can continue through block 340.

When no further adjacent regions remain to be analyzed, leading from decision block 360 or block 370, in block 350 an end change message can be constructed. In this regard, the consolidated set of image regions marked as having changed can be forwarded to application sharing clients during the update interval. Subsequently, the next region in the image of the shared application screen can be retrieved for analysis in block 355 and the process can begin anew in block 310.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A shared application smoothness system comprising:
   an application sharing server configured for communicative coupling to a plurality of application sharing clients; and,
   an application image update smoothness processor programmed to detect a change to any of a number of regions of an application image, to determine whether the change is localized to a particular region, or whether the change spans multiple adjacent regions, and when the change spans multiple adjacent regions to consolidate the change to the multiple adjacent regions for transmission to said communicatively coupled application sharing clients in a single application image update interval, but when the change is localized to the particular region to transmit the change to said communicatively coupled application sharing clients irrespective of changes to other regions of the image.

2. A shared application smoothness method comprising the steps of:
   partitioning a shared application screen image into image regions;
   monitoring the regions for change;
   detecting a change in a particular one of the regions of the shared application screen image;
   determining whether the change is localized to the particular one of the regions, or whether the change spans multiple adjacent regions; and,
   in the event that the change spans multiple adjacent regions, transmitting updates for the multiple adjacent regions to communicatively coupled application sharing clients in a single image update interval, but otherwise transmitting only the change for the particular one of the regions without regard to other changes to others of the multiple adjacent regions.

3. The method of claim 2, wherein said detecting step comprises the steps of:
   identifying a change in a primary display region in said shared application image;
   testing display regions which are adjacent to said primary display region for changes; and,
   grouping individual ones of said tested display regions with said primary display which are determined to have changed.

4. The method of claim 3, wherein said grouping step comprises the step of marking each changed display region as having changed.

5. The method of claim 3, wherein said transmitting step comprises the step of transmitting updates for said grouping to said communicatively coupled application sharing clients in a single image update interval.

6. The method of claim 3, further comprising the steps of:
   further testing display regions which are adjacent to each of said tested display regions which are determined to have changed;
   adding said further tested display regions to said grouping where said further tested display regions are determined to have changed; and,
   repeating said further testing and adding steps until no adjacent display regions are determined to have changed.

7. A machine readable storage having stored thereon a computer program for shared application smoothness, the computer program comprising a routine set of instructions which when executed by a machine cause the machine to perform the steps of:
   partitioning a shared application screen image into image regions;
   monitoring the regions for change;
   detecting a change in a particular one of the regions of the shared application screen image;
   determining whether the change is localized to the particular one of the regions, or whether the change spans multiple adjacent regions; and,
   in the event that the change spans multiple adjacent regions, transmitting updates for the multiple adjacent regions to communicatively coupled application sharing clients in a single image update interval, but otherwise transmitting only the change for the particular one of the regions without regard to other changes to others of the multiple adjacent regions.

8. The machine readable storage of claim 7, wherein said detecting step comprises the steps of:
   identifying a change in a primary display region in said shared application image;
   testing display regions which are adjacent to said primary display region for changes; and,
   grouping individual ones of said tested display regions with said primary display which are determined to have changed.

9. The machine readable storage of claim 8, wherein said grouping step comprises the step of marking each changed display region as having changed.

10. The machine readable storage of claim 8, wherein said transmitting step comprises the step of transmitting updates for said grouping to said communicatively coupled application sharing clients in a single image update interval.

11. The machine readable storage of claim 8, further comprising a routine set of instructions for further causing the machine to perform the steps of:
    further testing display regions which are adjacent to each of said tested display regions which are determined to have changed;
    adding said further tested display regions to said grouping where said further tested display regions are determined to have changed; and,
    repeating said further testing and adding steps until no adjacent display regions are determined to have changed.

* * * * *